O. A. F. MITTELSTÄDT.
TIRE SHIELD.
APPLICATION FILED MAR. 11, 1908.
940,343.
Patented Nov. 16, 1909.
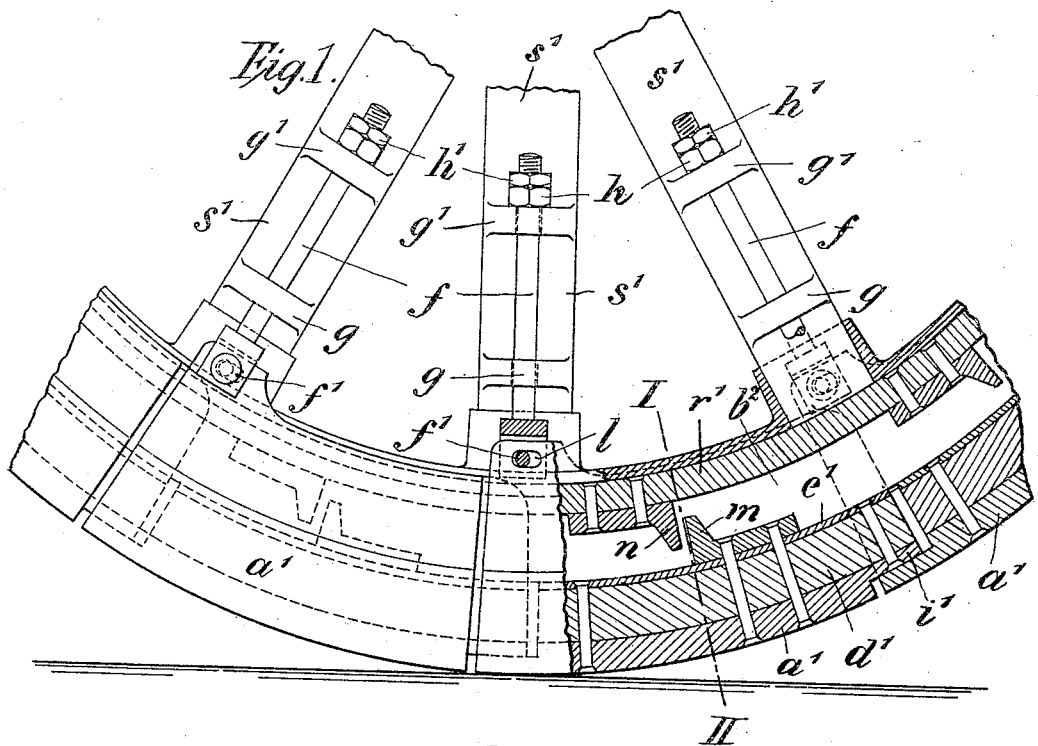
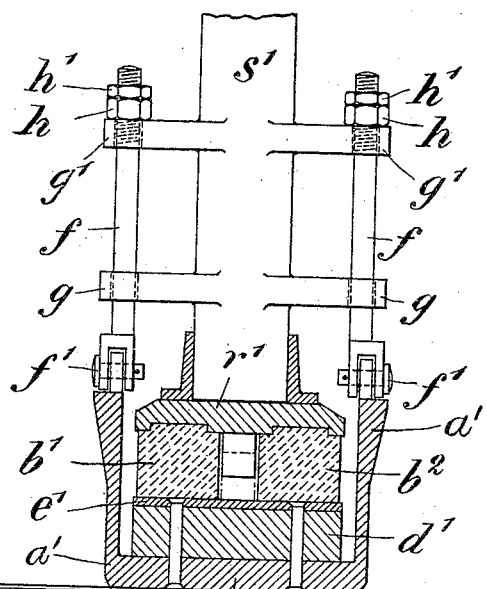
Witnesses.
Jesse N. Lutton
B. Sommers
Inventor.
Otto August Franz Mittelstädt
by Henry Ooth
Atty.

UNITED STATES PATENT OFFICE.

OTTO AUGUST FRANZ MITTELSTÄDT, OF HOHENSAATHEN-ON-THE-ODER, GERMANY.

TIRE-SHIELD.

940,343.  Specification of Letters Patent.  Patented Nov. 16, 1909.

Application filed March 11, 1908. Serial No. 420,517.

*To all whom it may concern:*

Be it known that I, OTTO AUGUST FRANZ MITTELSTÄDT, a subject of the German Emperor, and resident of Hohensaathen-on-the-Oder, Germany, have invented certain new and useful Improvements in Tire-Shields, of which the following is a specification.

The present invention relates to improvements in tire shields for protecting tires from abrasion and at the same time maintaining the resiliency of such tires under the varying pressure of loads and shocks.

My invention refers more particularly to that class of shields in which the shield is composed of a plurality of sections or portions adapted to overlap one another and to be attached to supporting means.

The object of my invention is to provide a protecting shield or casing made in sections and surrounding the tire subjected to abrasion, and to conect the end of each section, which overlaps the free end of the preceding section, to supporting means which are attached to the spokes of the wheel, said supporting means being adapted to be moved or adjusted in radial direction, in order to obviate the disengagement of the under and over lapping ends of the sections when the tire is under load.

With this object in view my invention consists in certain novel features of construction and combinations of parts as will be hereinafter fully described and pointed out in the claims with reference to the accompanying sheets of drawings, wherein—

Figure 1 is a side elevation, partly in section, of a part of a wheel provided with my improved shield sections or shoes; and Fig. 2 is a transverse section of the same on line I—II of Fig. 1.

Similar characters of reference refer to like parts in both of the figures.

In said drawings $r^1$ designates the rim, $s^1$ the spokes, $b^1$ and $b^2$ are two solid rubber tires attached to the rim and arranged to leave between them a central circular space or channel, $a^1$ is the U-shaped shoe or shield-section provided with a wooden filling piece or pad $d^1$ covered with a rubber lining $e^1$, $g$ $g^1$ are guide pieces firmly connected with the spoke, $f$ $f$ are the supporting rods to which the end of the shoe overlapping the tongue $i^1$ of the preceding shoe is attached by means of pins $f^1$, $h$ $h^1$ are the nuts for adjusting the supporting rods in radial direction.

The shoe $a^1$ is fitted upon the pins $f^1$ with oval slots $l$ allowing of a slight tangential displacement of the shoe with respect to the tires $b^1$ and $b^2$. Each shoe $a^1$ is provided with a stop piece $m$ projecting into the channel between the tires $b^1$ and $b^2$. A corresponding inverted stop piece $n$ is attached to the rim $r^1$, the said stop pieces are so arranged as to stand a little distance apart from each other. The length of this distance is equal or nearly equal to the length of the play of the pins $f^1$ in the oval slots $l$.

When the wheel or motor car is braked, the shoe or shoes $a^1$ receive by their friction on the ground a tangential displacement until the stop piece $m$ strikes against the stop piece $n$, whereby the relative movement of the shoe is barred. Any further tangential strain or pressure caused on the shoe by the braking of the motor car is then directly and positively transmitted by the said stop pieces to the wheel rim, so as to relieve the tire or tires from undue strain.

By the initial relative displacement of the shoe the tire or tires are subjected to a slight tangential compression which is sufficient when the braking ceases, to bring back the said shoe into its original position and to separate thereby the stop pieces so that in ordinary driving the latter are prevented from sliding or grinding upon or against each other.

As many changes might be made in the construction and relative arrangement of the different parts without involving a departure from the spirit of my invention, I would have it understood that I do not limit myself to the exact constructions shown and described, but consider myself at liberty to make such changes and alterations as fall within the scope of my invention.

I claim:

1. The combination with a wheel, of a pair of tires mounted on the rim thereof forming an annular channel between them, a plurality of overlapping shoes covering the tires, longitudinally movable rods connected to the shoes, radially disposed stops mounted on the wheel rim, and a stop connected with each shoe normally distanced from the rim stops and adapted to engage the latter.

2. The combination with a wheel, of a pair of tires mounted on a rim thereof forming an annular channel between them, a filling piece surrounding the tread of the tires, a plurality of overlapping shoes covering the filling piece, rods connected to the shoes, mounted on the wheel spokes and movable longitudinally thereof, radially disposed stops mounted on the wheel rim, and a stop connected with each shoe normally distanced from the rim stops and adapted to engage the latter.

3. The combination with a wheel, of a pair of tires mounted on the rim thereof forming an annular channel between them, a filling piece surrounding the tread of the tires, a plurality of overlapping shoes covering the filling piece, connecting rods mounted on the wheel spokes and adapted to move longitudinally thereof, radially disposed stops mounted on the wheel-rim, a stop connected with each shoe normally distanced from the rim-stops and adapted to engage the latter, and pins mounted in the ends of the connecting rods taking through slots formed in one end of the shoes for the purpose specified.

OTTO AUG. FRANZ MITTELSTÄDT.

Witnesses:
CARL GILNER,
RICHARD JESOM.